United States Patent Office 3,452,390
Patented July 1, 1969

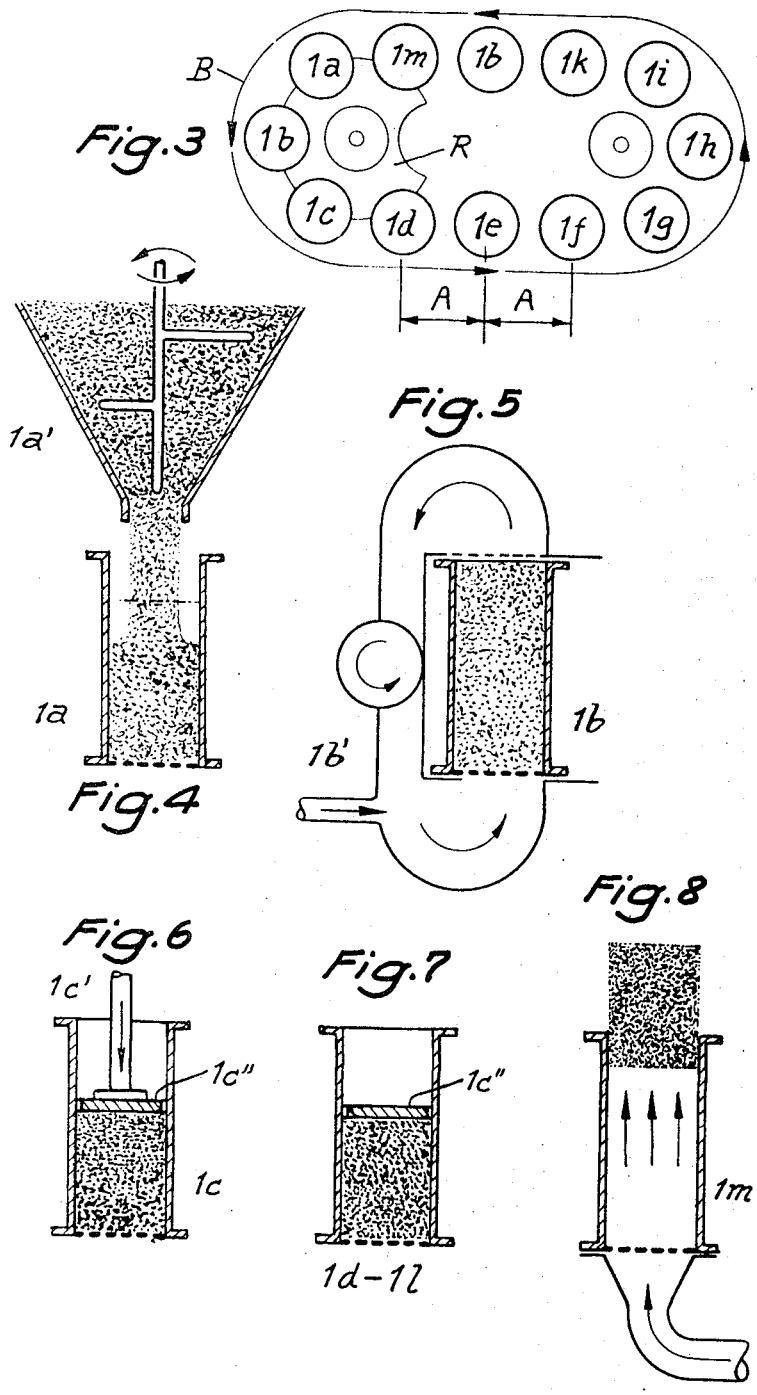

3,452,390
APPARATUS FOR THE PRODUCTION OF
FLEXIBLE FOAM PLASTIC ARTICLES
Werner Borcovec, Glattbrugg, Zurich, Switzerland, assignor to Gosta Trading Ltd., Zurich, Switzerland, a Swiss corporation
Filed Aug. 22, 1966, Ser. No. 574,192
Claims priority, application Switzerland, Aug. 24, 1965, 11,971/65
Int. Cl. B29d 27/00; B29c 25/00
U.S. Cl. 18—4
4 Claims

ABSTRACT OF THE DISCLOSURE

An apparatus for the production of flexible foam plastic articles in which the foamable thermoplastic particles are introduced intermittently into expansion and heating chambers. The expansion and heating chamber is sequentially connectable with a source of heating and fluidizing gas which heats superficial regions of the particles in a fluid bed, and with a compression chamber. In the latter, the particles are compressed by a plunger or movable mold wall. Preferably connection between the fluidizing chamber, the compression chamber and the heating conduit makes use of a three-way valve.

---

This invention relates to apparatus used in producing flexible and elastic shapes of foam plastic (synthetic resin) by sintering foam plastics consisting of fine particles, the sintering process being carried out under pressure inside molds; the invention also relates to a device for carrying out the method.

In the conventional procedure of producing flexible and elastic shapes—e.g., plane bodies—plastics capable of foaming, such as foamable polystyrene, are heaped into a rimmed plate mold until the layer reaches the desired thickness. As soon as the layer fits the form without any pressure being exerted thereon, it is preheated by heating the plates to 130° C.; the layer is then slightly compressed and subsequently cooled. In this way, similar non-foam preforms are obtained, such as are also produced from mixtures of thermoplastics and gas-generating agents in gas-tight molds under high pressure. These preforms should then be kept for 5 to 30 minutes in steam-heated autoclaves at a temperature of 110° to 115° C. until excess foam is produced. After removal of the highly expanded material from the autoclave, a light body, shrunk in its thickness, flexible and showing elasticity in compression is formed upon cooling in air. Material thus produced is highly suitable, say, as an insulating layer in garments, for wrapping pipes and also as shock-absorbing beds or mats.

A further method of producing flexible mats consists in expanding for a second time in an autoclave, plates cut from a block. Another well known method is that of pressing plates out of blocks to thus render them elastic by applying compression load.

However, all these conventional methods have the disadvantage that the shapes cannot be produced true to size, so that their manufacture is extremely difficult.

Further it is known to produce molded bodies from foam plastics consisting of fine particles by heating the plastic particles with hot gases or steam, filling a mold with the particles and sintering them under pressure. Molded foam-plastic shapes obtained according to this method are comparatively resistant to shocks and pressure.

Surprisingly enough it has been found that flexible elastic molded bodies true to size could be produced in a comparatively short time, if the surface of the foam particles was heated at temperatures above the plastic-softening point, and if the foam particles were compressed inside the mold at pressures between .05 and 1.5 atmospheres by means of a mold wall moving against the hollow space of the mold. This method has proved its worth especially for aerated-foam thermoplastics. In particular it has been found possible to mold shapes from mono- and copolymers of styrene developing foam. Preferably, the particles have an average diameter between .5 and 1 cm. They are obtained best from thermoplastics containing expanding agents capable of developing foam.

The particles are heated to such temperatures at which their surface temperature is higher than the softening point of the plastic material. Heating time and temperature depend on the nature and size of particles of the plastics. The particles may be heated inside the mold as long as the same is kept open. It is preferable to fill only part of it and to heat the particles by injecting heating gas, such as air or water steam. The gases should be blown through the mold at a rate such as to allow the particles to form a gas-operated fluidized bed. However, it is also possible to heat the particles outside of the mold in a separate heated area and then to introduce them into the mold. This may be done mechanically or pneumatically. The particles are preferably conveyed by means of hot air or vapor in order to have their surface retain the desired temperature. In any case it is important that the particles be heated prior to being compressed.

The particles are compressed in a mold having at least one movable wall. The movable wall is preferably designed as a punch which may be moved at will within the hollow space of the mold.

The heated particles are compressed at a pressure between .05 and 1.5 atmospheres, but preferably at .01 to 1.5 atmospheres. Pressure, time and load depend on the nature and shape of the particles of the plastic material and on the desired elasticity of the molded bodies to be produced.

Example 1

A sheet-metal cylinder, 40 cm. wide and 80 cm. high, with openings in its bottom, is filled to two-thirds of its height with fine particles of foam polystyrene. The polystyrene foam particles are kept in their original state by triple foaming of polystyrene containing pentane. The average size of the particles is .05 to 1 cm. The sheet-metal cylinder is covered with a grid and hot air of 110 to 115° C. is blown through the bottom of the cylinder in order to have the particles form a vortex. The injection of air is stopped as soon as the surface of the particles reaches the temperature of 107° C. Thereupon the grid is removed from the mold, and a punch as wide as the interior of the hollow space is introduced, until the pressure attains .3 atmosphere. After cooling, a molded shape of high flexibility is obtained.

Example 2

Inu a device as described in Example 1, foam polystyrene consisting of fine particles is heated for 10 seconds with hot steam at a pressure of .7 atmosphere above atmospheric. Then a punch is introduced into the cylinder, and the particles are compressed until the pressure attains .5 atmosphere above atmospheric.

The result is a molded shape of high flexibility.

Similarly, a molded shape may be obtained by compression of the particles at a pressure of .1 atmosphere. In this case, the particles are not completely bonded so that the spaces between them form channels. Such molded shapes are suitable, say, as upholstery material.

The method according to the present invention may be put into practical operation by means of a device comprising a heating or an expansion chamber adapted to house the primary and final foaming of the plastic material and capable of being connected on the one hand with a dosing device for the reactant and on the other hand with the compression chamber of a press, means being provided adapted to convey the plastic material made available portionwise and intermittently to the heating chamber and, after foaming, to the press.

The accompanying drawing shows diagrammatically two devices serving to work the method according to the invention.

FIG. 3 shows diagrammatically a top view of the device according to the second example of the embodiment;

FIGS. 4-8 represent diagrammatically single parts of the device during different phases of working the method.

Figure 1:
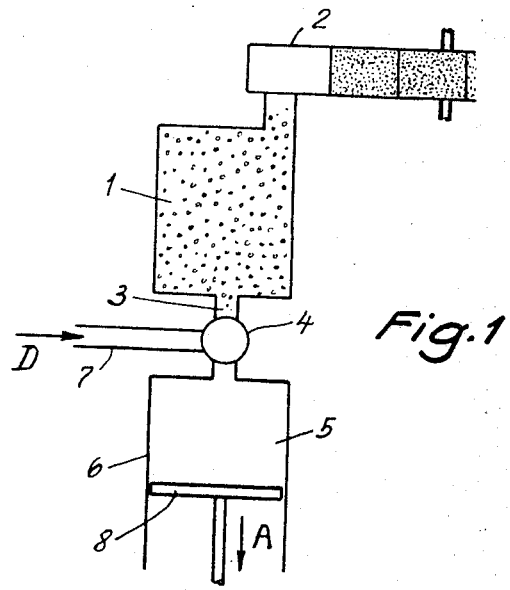
FIG. 1 represents the first example of embodiment of the device in a phase after completion of charging the heating chamber.
Figure 2:
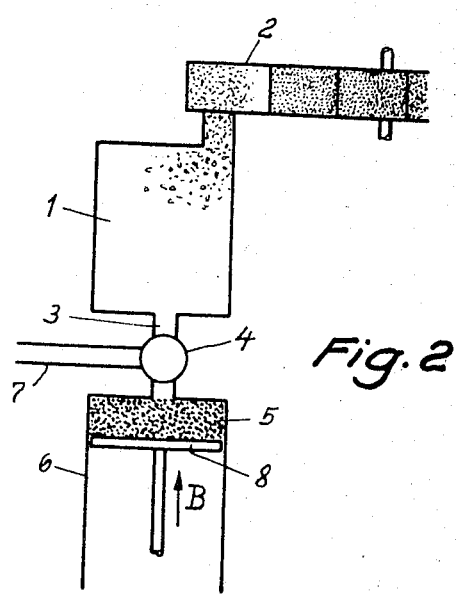
FIG. 2 shows the device during the compression stage, the heating chamber being charged anew simultaneously.

Referring more particularly to FIGS. 1 and 2, numeral 1 designates a heating or expansion chamber destined for the primary and final foaming of the plastic material to be worked, say, Styropor. Said chamber is connected on the one hand with a device 2 for dosing the reactant or the plastic, and on the other hand, through a conduit 3 having a three-way valve 4 installed therein, with the compression chamber 5 of a compression mold or press 6. Further, the three-way valve 4 is connected with a conduit 7 for the admission of hot compressed air or stream. Valve 4, in one position, connects the heating chamber 1 with the compression chamber 5 of the press. In the second position the valve connects chamber 1 with the hot air or the steam pipe 7. In the third position of the three-way valve both conduits 3 and 7 are shut.

For the purpose of molding the desired plastic shape, first the quantity of foam material made available by the dosing device is introduced into heating chamber 1, with three-way valve remaining closed. Thereupon, valve 4 is turned so as to allow hot air or steam to be injected into heating chamber 1 under appropriate pressure and via conduit 7. The plastic previously introduced into said chamber are, under thermal treatment, subjected either to primary or to final foaming, as desired, the size of the heating chamber being such as to allow the plastic introduced to inflate without originating an expansion pressure. On the other hand, the compression chamber's measures of capacity are sufficient for plastic arriving from the heating chamber as not to fill it completely so that comparatively low pressures arise when the plastic is compressed, and so that the plastic particles become superficially bonded only. The inflating process in heating chamber 1 takes place with an extraordinary rapidity, inasmuch as the plastic particles—generally in the form of pearls or powder—are completely fluidized and whirled by the gaseous heating medium injected under overpressure, and since they offer to the flow of heat an extraordinarily large heat transfer surface. With the molding plug still in the compression position, valve 4 is turned into a position to connect heating chamber 1 with compression chamber 5 of the press and, simultaneously, to shut medium conduit 7. Owing to overpressure in heating chamber 1 and to the downward motion of the molding plug (in direction as shown by the arrow A in FIG. 1) the foamed plastic particles enter all at once into compression chamber 5 of the press, where upon closure of tap 5 they are molded under slight pressure to the required shape according to the desired degree of flexibility or elasticity. Simultaneously with this compression process (arrow B in FIG. 2) heating chamber 1 is charged afresh, as shown in FIG. 2. Thus, dosing, charging, foaming and molding take place in one continuous intermittent operation.

During the compression process of the plastic and the removal of the finished molded shapes from the press, the heating chamber is charged anew as aforedescribed, and the plastic is heated by means of the heating medium conduit 7, and inflated. All these operations may be carried out in the simplest possible way, and by hand. However, it is also feasible to interconnect dosing device, heating chamber, three-way valve and press with a control mechanism, and to automize the various proceedings by operating the three-way valve after having introduced a dosed amount of the reactant into the heating chamber so that the tap connects the heating chamber and press, the inflated material being forced by the overpressure existing in the heating chamber to escape into the compression chamber of the press. Thereupon, the conduit between heating chamber and press is blocked, and the compression process is initiated. Simultaneously, the heating chamber is being charged and heated anew.

In the second example of embodiment as shown in FIGS. 3 through 8, provision is made of several heating chambers in form of compression cylinders $1a$–$1m$. They are equidistant from each other and are intermittently movable along a closed oval orbit B. The heating or pressing cylinders are provided with openings in their bottoms. The cylinders are driven along circuit B by a conveyor wheel designed in the manner of a sprocket.

Instead of cylinder $1a$ in FIG. 3, a device $1a'$ is fitted thereabove for the purpose of dosing and filling particles of foam plastics into the cylinder arranged therebelow (FIG. 4), while the cylinder $1b$, as shown in FIG. 3, is replaced by a device adapted to inject heating gases or steam (FIG. 5). As shown in FIG. 6, cylinder $1c$ in FIG. 3 has located thereabove a compression device with a plunger $1c'$ and a loose piston $1c''$, the latter remaining in the cylinder after compression up to the injection of the molded shape, as shown in FIG. 7. Instead of cylinder $1m$ in FIG. 3, a device $1m'$, as diagrammatically represented in FIG. 8, is provided for the ejection of the finished and cooled molded shapes. The ejection device and the compression device $1c'$ are not closely adjacent each other, but are spaced apart by several distances A. The molding shaped at $1c$ must pass the various halts or stations $1d$–$1l$ in order to reach the ejection point $1m$, when it cools partially or entirely during its travel.

What I claim is:

1. An apparatus for producing a succession of elastic bodies of a foam-synthetic resin, comprising at least one fluidizing and heating chamber; means for introducing a mass of foamable particles of said synthetic resin into said chamber; means forming at least one compression chamber connectable with said heating and fluidizing chamber and provided with means for compressing a mass of superficially heated particles received therefrom; a source of heating and fluidizing fluid connectable with said heating and fluidizing chamber; and control means for selectively and sequentially connecting said heating and fluidizing chamber with said source to fluidize and superficially heat said particles in said heating and fluidizing chamber, and for connecting said heating and fluidizing chamber with said compression chamber to discharge said superficially heated particles into the latter for compression therein.

2. The apparatus defined in claim 1 wherein said control means is a three-way valve, said source being a hot compressed-gas conduit connectable to said heating and fluidizing chamber by said valve, said apparatus further comprising a conduit connecting said chamber, said valve being located in said conduit.

3. The apparatus defined in claim 2 wherein said means for introducing said mass of particles into said heating and fluidizing chamber is a dosing device, said means for compressing the superficially heated particles in said compression chamber is a plunger and said control means further comprising means for operating said dosing device, said valve and said plunger in sequence whereby said dosing device charges a respective mass of said expandable particles into said heating and fluidizing chamber, said valve delivers hot compressed gas to said heating and fluidizing chamber, said valve thereafter discharges the superficially heated particles into said compression chamber while said dosing device delivers a fresh supply of expandable particles to said heating and fluidizing chamber.

4. The apparatus defined in claim 1 wherein said control means includes a conveyer for displacing said heating and fluidizing chamber along a closed transport path successively communicating with said source and with the means for compressing said particles.

References Cited

UNITED STATES PATENTS

| | | | |
|---|---|---|---|
| 3,129,464 | 4/1964 | Heider | 264—53 XR |
| 3,162,704 | 12/1964 | Attanasio et al. | 264—53 |
| 3,191,233 | 6/1965 | Linderoth. | |
| 3,268,636 | 8/1966 | Angell | 264—51 |
| 3,359,353 | 12/1967 | Oddi | 264—53 |
| 3,368,009 | 2/1968 | Oddi | 264—53 |

FOREIGN PATENTS 1,008,672  11/1965  Great Britain.

PHILIP E. ANDERSON, *Primary Examiner.*

U.S. Cl. X.R.

18—30; 263—21; 264—46, 53, 321, 345